United States Patent
Schiebener et al.

(10) Patent No.: US 12,545,211 B2
(45) Date of Patent: Feb. 10, 2026

(54) SEATBELT VERIFICATION (71) Applicant: Aptiv Technologies AG, Schaffhausen (CH)

(72) Inventors: David Schiebener, Mettmann (DE); Alexander Barth, Wermelskirchen (DE)

(73) Assignee: Aptiv Technologies AG, Schaffhausen (CH)

( * ) Notice: Subject to any disclaimer, the term of this patent is extended or adjusted under 35 U.S.C. 154(b) by 38 days.

(21) Appl. No.: 18/391,150

(22) Filed: Dec. 20, 2023

(65) Prior Publication Data

US 2024/0217477 A1 Jul. 4, 2024

(30) Foreign Application Priority Data

Dec. 30, 2022 (EP) .................................... 22217412

(51) Int. Cl.
*B60R 22/48* (2006.01)
*G06V 20/59* (2022.01)

(52) U.S. Cl.
CPC ............ *B60R 22/48* (2013.01); *G06V 20/593* (2022.01); *B60R 2022/4808* (2013.01); *B60R 2022/4866* (2013.01)

(58) Field of Classification Search
CPC ...................................................... G06V 20/59
See application file for complete search history.

(56) References Cited

U.S. PATENT DOCUMENTS

| | | | | |
|---|---|---|---|---|
| 10,296,102 B1* | 5/2019 | Misra | ...................... | G06T 7/215 |
| 10,322,728 B1* | 6/2019 | Porikli | .................... | G06V 10/80 |
| 11,113,840 B2* | 9/2021 | Ye | .............. | G06T 7/73 |
| 11,597,347 B2* | 3/2023 | George | ............ | B60R 21/01534 |
| 2019/0213406 A1* | 7/2019 | Porikli | ................. | G06V 20/597 |
| 2021/0081689 A1* | 3/2021 | Weyers | ................ | G06F 18/253 |
| 2021/0086715 A1* | 3/2021 | Baek | ........................ | G06N 3/09 |
| 2022/0203930 A1* | 6/2022 | Hu | ............................ | G06T 7/73 |

FOREIGN PATENT DOCUMENTS

CN 111469802 B 8/2022

OTHER PUBLICATIONS

"Marker-less Vision-based Detection of Improper Seat Belt Routing," Baltaxe, et al., IEEE Intelligent Vehicles Symposium (IV), Paris, France. 978-1-7281-0560-4/19/, Jun. 9-12, 2019.
Extended European Search Report regarding European Patent Application No. 22217412.0, dated Jun. 1, 2023.

* cited by examiner

*Primary Examiner* — Long T Tran
(74) *Attorney, Agent, or Firm* — Harness, Dickey & Pierce, P.L.C.

(57) ABSTRACT

The present disclosure relates to a computerized method of seatbelt verification in a vehicle is presented. The method comprises generating, based on an image showing a seat of the vehicle, at least one heatmap representing probabilities of a seatbelt being present in regions of the image, determining a routing of the seatbelt in the image based on the values of the heatmap, and determining whether the seatbelt is worn correctly based on the routing.

14 Claims, 5 Drawing Sheets

SEATBELT VERIFICATION

CROSS-REFERENCE TO RELATED APPLICATIONS

This application claims the benefit and priority of European patent application number 22217412.0, filed on Dec. 30, 2022. The entire disclosure of the above application is incorporated herein by reference.

FIELD

The present disclosure generally relates to safety improvements for vehicles and, in particular, to methods and systems of seatbelt verification in a vehicle.

BACKGROUND

This section provides background information related to the present disclosure which is not necessarily prior art.

Smart vehicles, such as smart cars, smart busses, and the like, are on their way to significantly improve the safety of passengers. Such smart vehicles may be equipped with on-board cameras and may be capable of capturing images of the vehicle's interior. Those images can then be used, sometimes in combination with other sensors, for different safety related tasks, such as detecting persons in the vehicle, categorizing persons in adults or children, detecting objects in the vehicle, determining whether one of the vehicle's door is open, or the like.

The most common safety measure in a vehicle is using a seatbelt. This has been proven to reduce the risk of bad or even lethal injuries in crashes. However, wearing a seatbelt in a wrong manner may reduce this positive effect or even worsen the situation, e.g., if the seatbelt strangulates a person sitting in the vehicle.

Hence, there is a need for verifying whether a seatbelt is worn correctly.

SUMMARY

This section provides a general summary of the disclosure, and is not a comprehensive disclosure of its full scope or all of its features.

In this context, methods, systems and computer program products are presented as defined by the independent claims.

More specifically, a computerized method of seatbelt verification in a vehicle is presented. The method comprises generating, based on an image showing a seat of the vehicle, at least one heatmap representing probabilities of a seatbelt being present in regions of the image, determining a routing of the seatbelt in the image based the values of the heatmap, and determining whether the seatbelt is worn correctly based on the routing.

In some embodiments, determining a routing of the seatbelt in the image based on the values of the heatmap comprises fitting one or more parametric curves to the at least one heatmap representing the routing of the seatbelt in the image. In such embodiments, the one or more parametric curves may comprise at least one of a circle, a straight line, a sequence of straight lines, an ellipse, a quadratic function, a higher polynomial function, a spline, and a Bezier curve.

In further embodiments, fitting one or more parametric curves to the at least one heatmap representing a routing of the seatbelt in the image comprises, until a stopping condition is fulfilled, determining a number of points of the heatmap that have a heat value above a threshold, determining a respective parametric curve according to the points, and calculating a rating for the parametric curve, wherein the rating reflects the fitting of the parametric curve to the heatmap, and, afterwards, returning the parametric curve with the highest rating. In related embodiments, calculating the rating comprises generating a sum of the heatmap values located in a range next to the parametric curve. In further related embodiments, calculating the rating comprises adding a reward value in response to the parametric curve being similar to a reference parametric curve empirically determined for the position of the seatbelt.

In some further embodiments, determining whether the seatbelt is worn correctly on the seat based on the one or more parametric curves comprises determining a relation between the one or more parametric curves and at last one of at least one body keypoint determined for a person detected on the seat, at least one seat keypoint determined for the seat, parameters of reference parametric curves, at least one location in the image related to a seatbelt dispenser or seatbelt buckle, and a region of the image determined for the routing of the seatbelt, and determining, based on the relation, whether the seatbelt is worn correctly. In related embodiments, the seatbelt is a 3-point seatbelt with a diagonal part and a horizontal part, and fitting one or more parametric curves to the at least one heatmap comprises fitting a first parametric curve to the heatmap related to the diagonal part, and determining whether the seatbelt is worn correctly comprises determining a first position score based on a relation of the first parametric curve to a shoulder keypoint of a detected person, wherein a position score reflects the correctness of the worn seatbelt. In further related embodiments, fitting one or more parametric curves to the at least one heatmap further comprises fitting a second parametric curve to the heatmap related to the horizontal part, and determining whether the seatbelt is worn correctly further comprises determining a second position score based on a relation of the second parametric curve to a torso keypoint of the detected person, and generating a fused position score by weighted averaging the first position score and the second position score.

In some embodiments, the at least one heatmap is generated by applying an artificial neural network, by a color similarity algorithm, or by local histogram similarity statistics. In further embodiments, the image is captured by an on-board camera, wherein the image is a color image, an infrared image, a depth image, or a combination of these. In yet further embodiments, the method is triggered by at least one of detecting a weight on the seat, detecting that the seatbelt is inserted in the seatbelt buckle, and detecting a person in the vehicle. In related embodiments, detecting the person on the seat is based on at least one of the image, an input of an ultrasound sensor, an input based on data from an radar sensor, an input based on data from a Light Detection and Ranging, LiDAR, scanner, a thermal image, temperature measurements, and electromagnetic field measurements.

In some embodiments, the method further comprises determining a confidence value for the seatbelt being worn correctly on the seat, and, in response to the confidence value being below a threshold, causing an output of at least one of an acoustic warning signal, a visual warning signal, and a warning note on a smart media system. In related embodiments, the confidence value is further determined based on information received from at least one of a weighting sensor, a seatbelt buckle sensor, or a seatbelt dispenser sensor.

Another aspect concerns a seatbelt verification system in a vehicle implementing the methods as described herein.

Yet another aspect concerns a vehicle that comprises a camera for capturing images and the seatbelt verification system as described herein.

Finally, a computer program is presented that comprises instructions which, when the program is executed by a computer, cause the computer to carry out the methods described herein.

Further refinements are set forth by the dependent claims.

These and other objects, embodiments and advantages will become readily apparent to those skilled in the art from the following detailed description of the embodiments having reference to the attached figures, the disclosure not being limited to any particular embodiments.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

The foregoing and further objects, features and advantages of the present subject matter will become apparent from the following description of exemplary embodiments with reference to the accompanying drawings, wherein like numerals are used to represent like elements, in which.

Corresponding reference numerals indicate corresponding parts throughout the several views of the drawings.

DETAILED DESCRIPTION

Example embodiments will now be described more fully with reference to the accompanying drawings.

The present disclosure relates to methods and systems of seatbelt verification that improve the safety of vehicles, such as cars, trains, busses, ships, and the like. A vehicle is also referred to in the following as smart vehicle, smart car, or car.

Seatbelt reminder functions in vehicles, which are partially legally required, typically consist of two elements. A sensing unit that detects that a person is present at a given seat in the vehicle, and a second sensing unit that detects whether the seatbelt is used at all. Both tasks can be fulfilled by cameras or other sensors. If a camera is used for fulfilling the tasks, the camera can, besides other applications, replace the traditional sensors for two or more seats of the vehicle, e.g., the car.

In addition to detecting whether the seatbelt is used, like a buckle sensor or a seat belt extension sensor would, a camera-based solution also has the potential to determine a more exact routing of the seatbelt in addition to only detecting whether the seatbelt is worn at all. Thus, a method of determining the routing of a seatbelt is presented based on which it is possible to detect whether the seat belt is routed properly or worn incorrectly.

Figure 1:
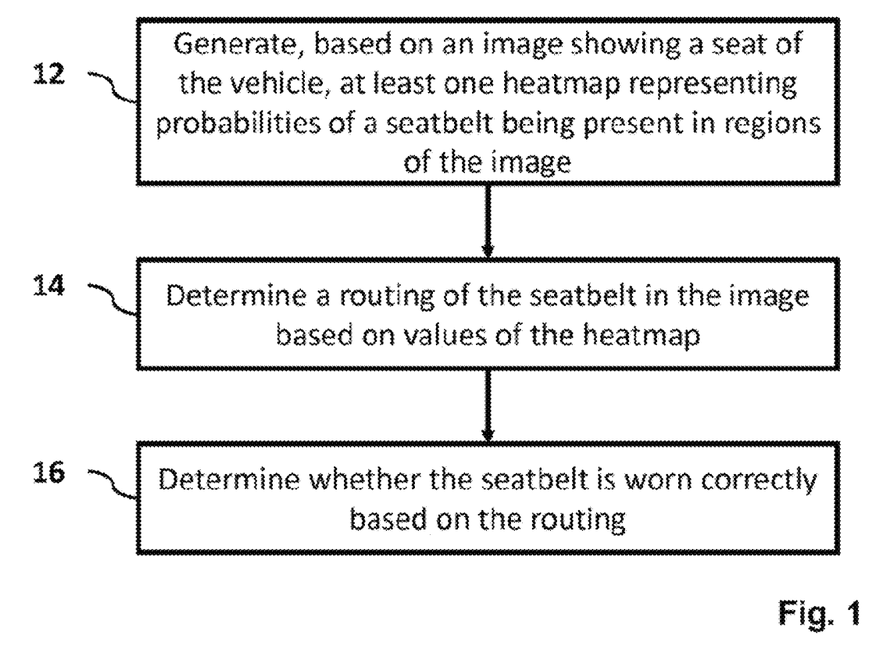
FIG. 1 illustrates a basic flow chart of the method disclosed herein.

FIG. 1 is a basic flow chart of the method disclosed herein. The method starts with generating, based on an image showing a seat of the vehicle, at least one heatmap representing probabilities of a seatbelt being present in regions of the image in box 12. The image may be is captured by an on-board camera. The image may alternatively be captured by mobile camera, e.g., in a smart phone or the like, which is connected to the smart vehicle via cable or wirelessly. The image may also be captured by a plurality of cameras with the information of all cameras being fused into one image. The image may be a color image, an infrared image, an image with depth information, or a combination of these.

The image may also be preprocessed before the heatmap is generated based on it. Preprocessing may comprise selecting only a part of the image, wherein the part of the image depicts one seat in the vehicle. Additionally or alternatively, the image may be resized for faster processing.

In an embodiment, the input camera image is processed to create a heatmap indicating image regions with a high likelihood of containing the seatbelt. Therefore, the image is subdivided in a plurality of smaller regions, e.g., pixels, rectangular areas with a plurality of pixels, or the like, for which heatmap values are determined. The heatmap values then reflect the likelihood of containing the seatbelt, e.g., high values for regions that are likely to show the seatbelt, e.g., because these regions have the color of the seatbelt or a different color to the background or such.

Suitable models for heatmap generation are color similarity models or basic statistics like local histograms. Moreover, an approach, which also produces a reliable heatmap, is to use artificial neural networks. Convolutional neural networks (CNN) have proven particularly successful for this task but other machine learning models, such as a gradient boosted tree, a random forest, an artificial neural network, a recurrent neural network, a convolutional neural network, an autoencoder, a deep learning architecture, a support vector machine, a data-driven trainable regression model, a k-nearest-neighbor classifier, a physical model, and/or a decision tree, or a combination thereof, can be applied, too. For example, all those architectures that output image-like 2D arrays with one or more channels are usable to create a heatmap. In a particular embodiment, a convolutional neural network which consists of several convolutional layers is applied. By adding skip connections between the earlier and later layers of such a network, the reliability of the heatmaps can be improved. Such a network with few layers, e.g., 2, 3, 4 or 5, and a limited number of channels, e.g., 3 or 4, per layer can achieve good results.

More complex architectures, like U-Net or the like, allow for even better results at the cost of increased computational effort. Other parameters influencing the result quality and effort are the input and output resolution. The latter is in particular relevant for the achievable precision of the subsequent routing estimation. The amount of training data that is required to allow the neural network to generalize well to unseen data also grows with the complexity of the used model.

After determining the heatmap values, a routing of the seatbelt in the image is determined based on these heatmap values in box 14. In some embodiments, the routing may relate to a curve or an area that reflects where the seatbelt is worn. In some embodiments, determining the routing may comprise fitting one or more parametric curves to the at least one heatmap representing the routing of the seatbelt in the image. The one or more parametric curves may comprise at least one of a circle, a straight line, a sequence of straight lines, an ellipse, a quadratic function, a higher polynomial function, a spline, and a Bezier curve.

For example, a parametric 2D curve is fitted to the heat map. In principle, any type of curve can be fit with the help of any parameter estimation or optimization method. In practice, a rather simply shaped type of curve, which allows efficient computation of the distance of a point to the curve, is preferred over a more complex one. In one implementation, circles have been proven to provide a reliable fitting. Other suitable choices could be straight lines, sequences of straight lines, ellipses (axis-aligned or not), quadratic (parabola-shaped), or cubic (S-shaped) polynomial functions. Splines, Bezier curves etc. are possible, too.

For estimating the parameters of the curve, a random sample consensus (RANSAC) algorithm can be applied, which is particularly useful in fitting tasks with a lot of outliers present. Since heatmaps can include noise, the RANSAC algorithm is beneficial. A circle can be defined by three different co-linear points. In an example, points of the heatmap, which have a value above a certain threshold, are randomly selected. Afterwards, a rating for the circle defined by the three different points is determined. The rating reflects the fitting of the parametric curve to the heatmap values. This is repeated either until a stopping condition is reached. Such stopping condition can be that no better circle, i.e., with a higher rating, has been found for a certain number of attempts or until a certain total number of attempts has been made. The circle with the highest rating is returned as fitted curve, i.e., as the routing of the seatbelt.

The rating may in some examples be calculated by overlaying the circle with the heatmap, and adding up the heatmap values in such a way that the points coinciding with or being very close to the circle are added with a high weight and those with a small to moderate distance with an increasingly lower weight. In this manner, circles that cover many high values in the heatmap get a high rating. In further embodiments, the calculated rating is modified to give slightly higher scores to circles with a radius in a range that we would empirically expect given the usual curvature of a seatbelt.

Finally, it is determined whether the seatbelt is worn correctly based on the routing in box 16. In some embodiments, if the returned parametric curve (e.g., circle) has a rating above a certain threshold, it will be categorized a positive detection of the seatbelt. Otherwise, it is assumed that the seat belt is not worn or too occluded for proper detection. If the seatbelt has been positively detected with a curve having a rating above the threshold (i.e., the routing), the routing is used to determine whether the seatbelt is worn correctly.

In an example of the 3-point seatbelt, the determination may be based on the routing of the main or diagonal part of the seatbelt, which runs from the seatbelt dispenser diagonally over the upper body to the seatbelt buckle. The secondary or hip/horizontal part of the seatbelt runs from the buckle horizontally over the hip to the fixation at the lower part of the side of the car next to the seat. That secondary part of the seatbelt is however often occluded due to people having a big belly or wearing voluminous clothing. The primary diagonal part of the seatbelt may be put in relation to key points of the body. Such key points may be also determined based on the image by another (or the same) component in the vehicle.

In particular a position score for the geometric relation of the location of the shoulder key point and the routing may be calculated. If the shoulder point is on the correct, expected side of the seatbelt and the distance to the routing is relatively small, a high position score is calculated. The farther the distance is, the lower the position score is set. If the shoulder key point appears to be on the wrong side of the seat belt, the position score shall be still moderate, but with increasing distance on the wrong side the rating becomes increasingly worse.

Additionally, further points on the torso and/or near the buckle can be taken into account to rate whether the seat belt is running within an acceptable distance of them. If the hip part of the seat belt is visible, it can be rated in a similar manner. Finally, in some embodiments, a fused position score of the position score for the diagonal part and the horizontal part can be obtained and the decision whether the seatbelt is worn correctly can be done on this fused position score. Hence, one or several position score values can be normalized to represent a form of probability, which can then be fused, e.g., by averaging or applying Bayes' rule.

In an embodiment of the method, a classifier is trained, which, based on the heatmap and, e.g., the input image, directly determines the routing and also classifies the seat belt as being worn correctly or not (e.g., a combination of processes depicted in boxes 14 and 16). In general, any seatbelt related classifier can profit from the generated heatmap as an additional input. Alternatively, one or more image regions can be defined, in which the seat belt is expected to be visible when it is worn properly, and regions in which it should not be visible. These regions can be defined either in fixed locations or relative to certain body parts. Hence, the routing is then determined based on high heatmap values (box 14). The decision of whether the seatbelt is worn correctly (box 16) may then be based on a comparison between the heatmap values and the defines region, e.g., based on empirical.

Figures 2A, 2B:
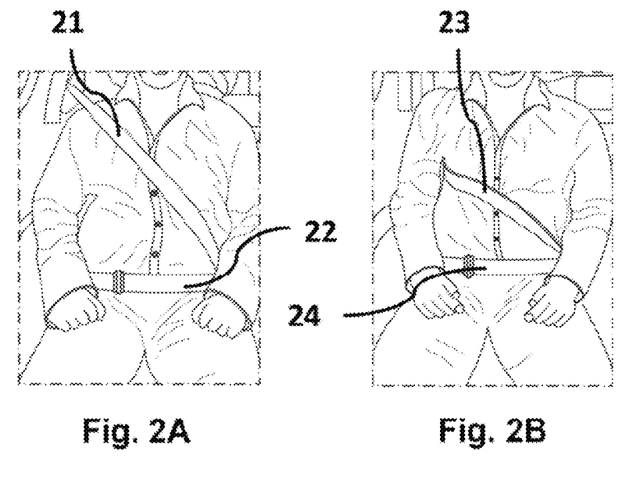
FIG. 2A illustrates an image of an interior of a vehicle showing a correctly worn seatbelt.
FIGS. 2B and 2C illustrate examples of incorrectly worn seatbelts.
Figure 2C:
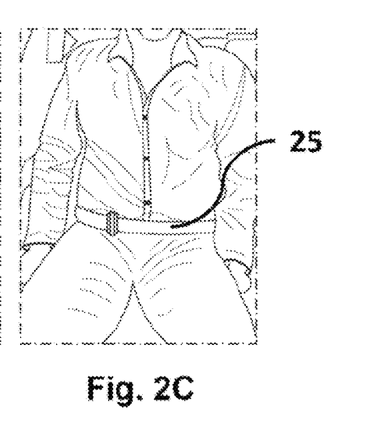

Now turning to FIGS. 2A, 2B, and 2C. FIG. 2A depicts an image of an interior of a vehicle showing a correctly worn seatbelt. Wearing a 3-point seatbelt with a diagonal part 21 and a horizontal part 22 correctly means that the diagonal part 21 starts at the seatbelt dispenser next to the right shoulder of the person and ends at the seatbelt buckle near the left hip of the person. The diagonal part 21 lies on the person's shoulder. The horizontal part 22 goes from the seatbelt buckle to the seatbelt fixator on the right side of the person's hip. Hence, the seatbelt is worn correctly.

In contrast, FIGS. 2B and 2C show examples of incorrectly worn seatbelts. In FIG. 2B, the seatbelt is not worn correctly since the diagonal part 23 is placed under the right arm of the person. The horizontal part 24 is correctly worn.

However, for safety reasons, the diagonal part 23 is more important. Hence, the seatbelt should be considered to be worn incorrectly. In FIG. 2C, the seatbelt is also not worn correctly since the diagonal part is placed behind the person—it is not visible. The horizontal part 25 is still worn correctly but for safety reasons, this seatbelt should also be considered to be worn incorrectly. Other examples of seatbelt worn incorrectly may include that the diagonal part is worn correctly, such as the diagonal part 21 in FIG. 2A, but the horizontal part is placed behind the person. The aim of the methods presented herein is to verify that the seatbelt is worn correctly, i.e., as shown in FIG. 2A.

Figure 3A:
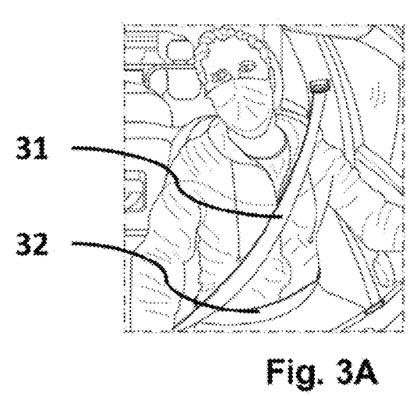
FIGS. 3A and 3B illustrate persons with seatbelts.
Figure 3B:
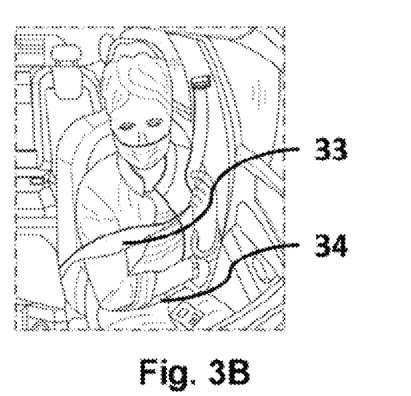

FIGS. 3A, 3B 4A, 4B, 5A, and 5B depict examples of how the methods described herein may determine whether a seatbelt is worn correctly. FIG. 3A depicts an image of a person wearing a 3-point seatbelt correctly. The diagonal part 31 and the horizontal part 32 are worn as required for safety reasons. Moreover, the quality of the image is good in such that the seatbelt is also not or very limitedly occluded. In contrast, FIG. 3B depicts an image of a person wearing the seatbelt incorrectly. The diagonal part 33 is placed on the right shoulder of the person instead of placed below the arm. Moreover, the horizontal part 34 is occluded by the arm of the person. This is a situation that regularly occurs in images. The seatbelt running through the image is often partially occluded, e.g., by hands, arms, hair, or clothes of the person wearing it.

Figure 4A:
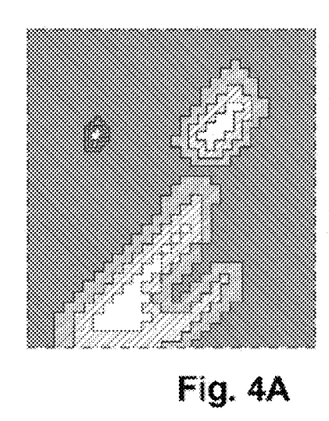
FIGS. 4A and 4B illustrate heatmaps for the images of FIGS. 3A and 3B according to embodiments of the disclosure.
Figure 4B:
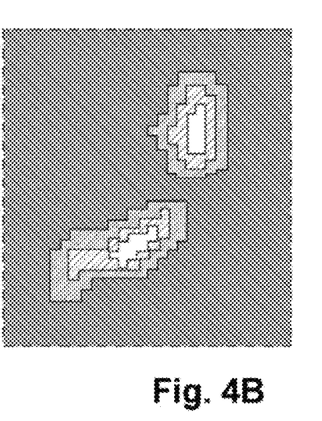

FIG. 4A depicts the heatmap for the image of FIG. 3A; FIG. 4B depicts the heatmap for the image of FIG. 3B. The heatmap may be generated by a color similarity model, basic statistics like local histograms, or by artificial neural networks, such as a convolutional neural network (CNN). The heatmap may indicate image regions with a high likelihood of containing the seatbelt. Therefore, the image is subdivided in a plurality of small regions, e.g., pixels, rectangular areas with a plurality of pixels, or the like, for which heatmap values are determined. The heatmap values then reflect the likelihood of containing the seatbelt, e.g., high values for regions that are likely to show the seatbelt, e.g., because these regions have the color of the seatbelt or a different color to the background or such. In FIGS. 4A and 4B, the light regions depict high values of the heat map, i.e., the likelihood of the seatbelt being there is high.

As can be seen from FIG. 4A, there are light regions for the diagonal part 31 and for the horizontal part 32. In FIG. 4B, there is only a light region for the diagonal part 33 but no light region for the horizontal part 34.

In order to deal with the occluded parts, the method in some embodiments applies a neural network to determine the heatmap labels the visible and occluded parts of the seatbelt differently for training. Such a labelling of visible and occluded parts may be based on a sequence of straight lines generated based on the visible parts and generating connecting straight lines for the invisible parts. Hence, the complete routing of the seatbelt can be determined with enabling a different handling of visible and occluded parts for the training of the neural network.

A usual neural network is able to highlight the regions of the heatmap that correspond to the image regions in which the seatbelt is visible. A sufficiently advanced neural network with labelled input data, e.g., which has been trained with enough representative labelled data as described above, may also be able to predict the locations in which the seatbelt is running but occluded. In the resulting heatmap, the occluded portions of the seat belt could then be highlighted similarly to the visible ones or with a weaker intensity. In another embodiment, a two-channel heatmap may be trained where one channel is for the visible parts and one channel is for the occluded parts of the seatbelt. This allows for different implementations of the routing estimation.

Figure 5A:
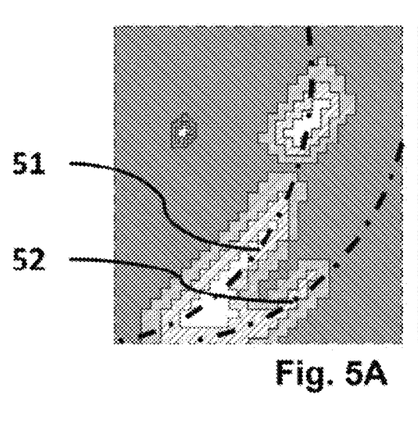
FIGS. 5A and 5B illustrate parametric curves fitted to the heatmaps of FIGS. 4A and 4B according to embodiments of the disclosure.
Figure 5B:
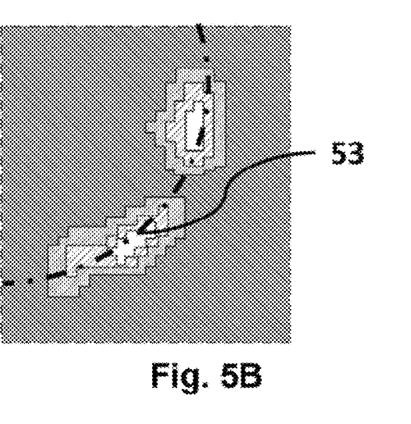

FIGS. 5A and 5B depict parametric curves fitted to the heatmap that represent the routing of the seatbelt in the image. In this example, the parametric curves are circles. Other choices for the parametric curves could be straight lines, sequences of straight lines, ellipses (axis-aligned or not), quadratic (parabola-shaped), or cubic (S-shaped) polynomial functions. Splines, Bezier curves etc. are possible, too. As can be seen in FIG. 5A, circle 51 for the diagonal part 31 has a wider radius and a different center than circle 52 for the horizontal part 32. In FIG. 5B, there is only one circle 53 for the diagonal part 33 as the horizontal part 34 is not visible. In one embodiment of creating the heatmap with a neural network that is trained to detect non-visible parts of seatbelts, there may also be fitted a second circle to the heatmap of FIG. 4B.

Figure 6:
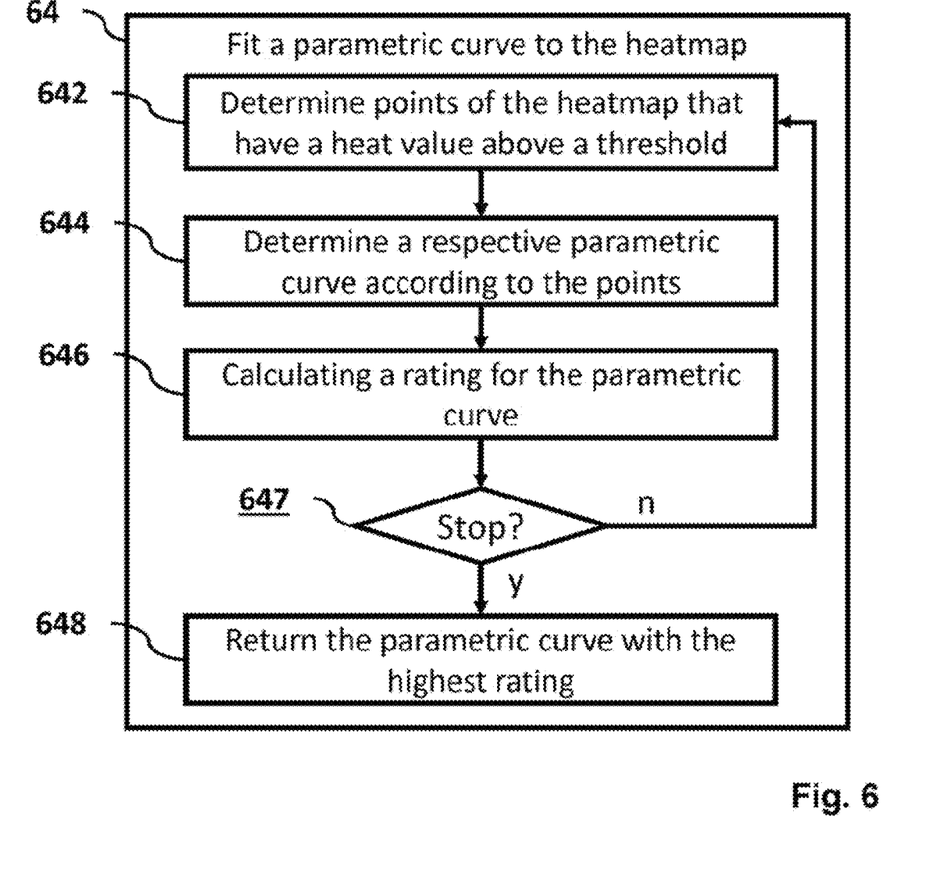
FIG. 6 is a flowchart of fitting a parametric curve to the heatmap according to embodiments of the disclosure.

Now turning to FIG. 6, which depicts an embodiment of how to determine the routing of the seatbelt. Determining a routing of the seatbelt in the image based on values of the heatmap (box 14 in FIG. 1) may in some embodiments comprise fitting one or more parametric curves to the at least one heatmap representing a routing of the seatbelt in the image, as shown with the outer box 64. Fitting the curves then may comprise determining a number of points of the heatmap that have a heat value above a threshold (box 642). In the example of a circle or a quadratic function for the parametric curve, the number of points will be three. In the example of a straight line for the parametric curve, two points suffice. More points may be utilized for other shapes of the parametric curves.

A respective parametric curve may then be determined according to the points (box 644). This may lead to a specific function for which it can be determined, which parts of the heatmap are covered/traversed by the function. A rating for the parametric curve, i.e., the curve/function determined by the points, may be determined (box 646). The rating reflects the fitting of the parametric curve to the heatmap. The rating may be determined by generating a sum of the heatmap values located in a range next to the parametric curve. For example, the heatmap values of areas in the image may be added for those areas the parametric curve is traversing through. In some embodiments, the heatmap values of the adjacent areas (within a specific range) are added, too. In this embodiment, the heatmap values of the adjacent areas may be weighted with a different factor than the ones the parametric curve is traversing through.

In some embodiments, the rating comprises adding a reward value in response to the parametric curve being similar to a reference parametric curve empirically determined for the position of the seatbelt. For example, if the center and the radius of the determined circle is similar to a center and radius of a reference circle determined statistically for the respective seat and/or the respective person (identified also by using the image), the rating may be given a reward value.

The three processes of boxes 642, 644, and 646 are repeated as long as a stopping condition is reached (see box 647). The stopping condition may be that no better parametric curve, i.e., with a higher rating, has been found for a certain number of rounds, until a predefined number of parametric curves has been tried, until a predefined time has lapsed, or that an amount of computational resources has been used. When the stopping condition is reached, the parametric curve with the highest rating is returned (box 648).

This parametric curve will then be used for determining whether the seatbelt is worn correctly (box 16 of FIG. 1). This determination may then be based on the one or more parametric curves and may comprise determining a relation between the one or more parametric curves and at least one body keypoint determined for a person detected on the seat and/or at least one seat keypoint determined for the seat. With a detection module that also processes the image, persons in a vehicle can be detected.

Usually, two types of keypoints can be determined for a person on a set. Keypoints of the vehicle seat (seat keypoints) facilitate identification of seating positions and distance between seat and camera. The seat keypoints are given or predefined characteristic points of the seat on which the person to be detected is seated. Body keypoints are characteristic points of a human body which are given or predefined, such as forehead, eyes, shoulders, elbows, hips, and the like. A relation may be the distance to the body and/or seat keypoints. The relation may also comprise the specific position, e.g., whether the parametric curve is above or below a keypoint.

Additionally or alternatively, the determination may comprise determining a relation between the one or more parametric curves and parameters of reference parametric curves. Reference parametric curves may reflect how the parametric curves shall be located if the seatbelt is worn correctly. The parameters may be determined statistically for a seat or a person and/or may be predefined or calculated historically for the respective vehicle. A relation may then comprise the difference of the parameters and may also comprise weights for the directional change (increasing/decreasing) in the parameters.

Additionally or alternatively, the determination may comprise determining a relation between the one or more parametric curves and at least one location in the image related to a seatbelt dispenser, seatbelt buckle, or a seatbelt fixator. Although the seatbelt dispenser, seatbelt buckle, or seatbelt fixator may also be determined as seat keypoints, the positions can also be predefined. Additionally or alternatively, the determination may comprise determining a relation between the one or more parametric curves and a region of the image determined for the routing of the seatbelt. In such an embodiment, a region may be defined. It may then be determined whether the curve or a large part of the parametric curve is in the predefined region.

Based on the relation, which may result in value for a position score, it is then determined whether the seatbelt is worn correctly. For example, if the relation leads to a high position score, it may be determined that the seatbelt is worn correctly. If the relation leads to a medium position score, it may be determined that no decision may be made and that further sensor data or user input is required. If the relation leads to a low position score, it may be determined that the seatbelt is not or completely incorrectly worn. To define a range of high positions score, a range of medium position scores, and a range of low positions score, two thresholds may be specified. Position score above an upper threshold are defined to be high position scores. Position scores below a lower threshold are defined to be low position scores. Positions between the upper threshold and the lower threshold are defined to be medium position scores.

Figure 7:
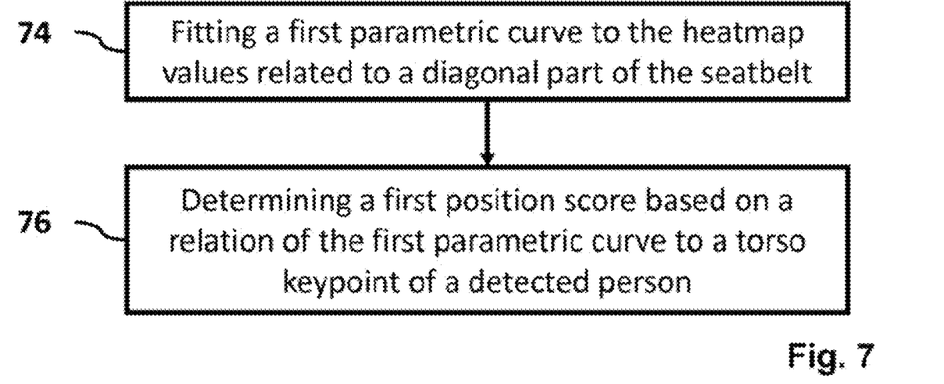
FIG. 7 is a flowchart of fitting a first parametric curve according to an embodiment with a 3-point seatbelt.

FIG. 7 is a flowchart of fitting a first parametric curve according to an embodiment with a 3-point seatbelt. This first parametric curve is fitted to the diagonal part in box 74, e.g., the diagonal part 21, 23, 31, or 33. The fitting of the parametric curve to the diagonal part may be achieved according to any embodiment described herein.

For this best curve, e.g., the one with the highest rating for the generated heatmap, a first position score based on a relation of the first parametric curve to a torso keypoint, e.g., a hip keypoint or a shoulder keypoint, of a detected person is determined in box 76. The first position score may be high, e.g., 100 on a scale 1 to 100, if the parametric curve of the diagonal part 31 is within a range, e.g., within 10 cm above the left shoulder of the person (i.e., on the right side of FIG. 3A) and/or if the parametric curve of the diagonal part 31 is within a range, e.g., within 5 cm above the right hip keypoint of the person (i.e., on the left side at the bottom of FIG. 3A). In an embodiment, no parametric curve is fitted to the horizontal part and the determination whether the seatbelt is worn correctly is only based on the first position score.

Figure 8:
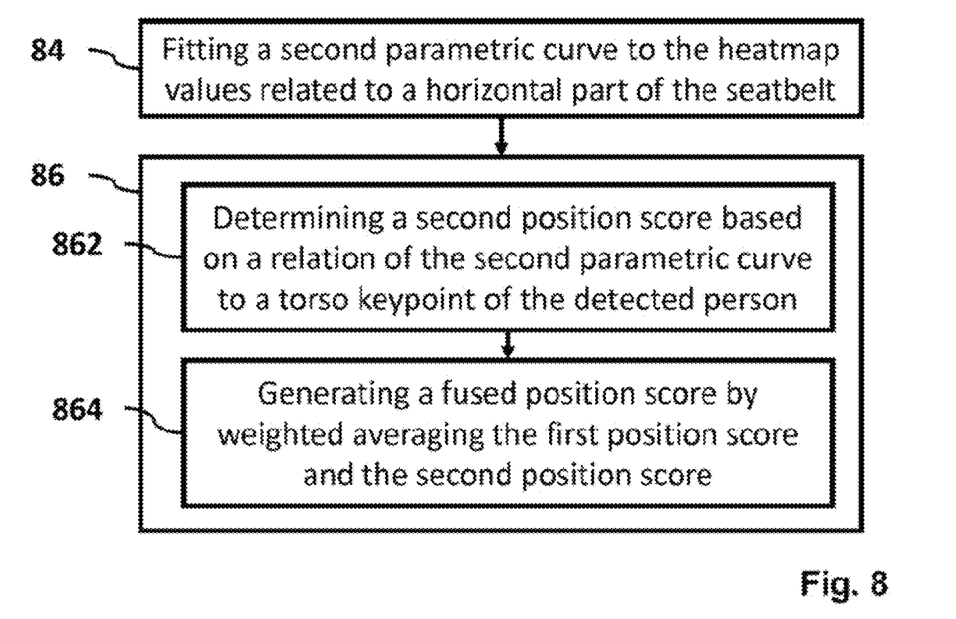
FIG. 8 is a flowchart of fitting a second parametric curve according to an embodiment with a 3-point seatbelt.

FIG. 8 is a flowchart of fitting a second parametric curve according to an embodiment with a 3-point seatbelt. This second parametric curve is fitted to the horizontal part in box 84, e.g., the horizontal part 22, 24, 25, 32 or 34. The fitting of the parametric curve to the horizontal part may be achieved according to any embodiment described herein.

In such an embodiment, determining whether the seatbelt is worn correctly, comprises another two processes as shown in box 86. For the best second parametric curve, e.g., the one with the highest rating for the generated heatmap, a second position score based on a relation of the second parametric curve to a torso keypoint, e.g., a hip keypoint or a shoulder keypoint, of a detected person is determined in box 862. The second position score may be high, e.g., 100 on a scale 1 to 100, if the parametric curve of the horizontal part 32 is within a range, e.g., within 5, 10, or 15 cm, from the right and left hip keypoint of the person in FIG. 3A.

In such an embodiment with a second position score, a fused position score may be generated by weighted averaging the first position score and the second position score as shown in box 864. For example, the first position score may be weighted by 2 as the diagonal part is more important for safety reasons and the second position score may be weighted by 1 before they are fused, e.g., added. Other weights are possible, too. In such an embodiment, the determination whether the seatbelt is worn correctly is then based on the fused position score.

The methods as described herein may be executed when the vehicle is in use. Use of the vehicle is to be understood as anything that activates the power supply in the vehicle, i.e., unlocking the doors, approaching the vehicle with the key/token for keyless entry systems, driving the vehicle, and the like. In some embodiments, the methods may be triggered by detecting a weight on the seat, e.g., an input provided by a weighting sensor. Additionally or alternatively, the methods may be triggered by detecting that the seatbelt is inserted in the seatbelt buckle, e.g., an input provided by an sensor comprised in the seatbelt buckle.

Additionally or alternatively, the methods may be triggered by detecting a person in the vehicle, e.g., an input provided from a person detection module. Detecting the person on the seat may be based on at least one of the image, an input of an ultrasound sensor, an input based on data from an radar sensor, an input based on data from a Light Detection and Ranging, LiDAR, scanner, a thermal image, temperature measurements, and electromagnetic field measurements.

The position scores as described above may be considered a confidence value for the seatbelt being worn correctly on the seat. However, in some embodiments, such a confidence value may also be determined, e.g., based on the position score and further input, such as input from at least one of a weighting sensor, a seatbelt buckle sensor, a seatbelt dispenser sensor, or further modules/sensors comprised by the vehicle. In particular, if the position score is medium, further input may be needed. In response to the confidence value being below a threshold, an output of at least one of an acoustic warning signal, a visual warning signal, and a warning note on a smart media system may be caused.

The methods described herein may be implemented in a seatbelt verification system. The seatbelt verification system may be comprised by a vehicle but also executed remotely and only the results may be provided to the computing system of the vehicle. If the seatbelt verification system is comprised by a vehicle, the vehicle may also comprise a camera for capturing the image.

Figure 9:
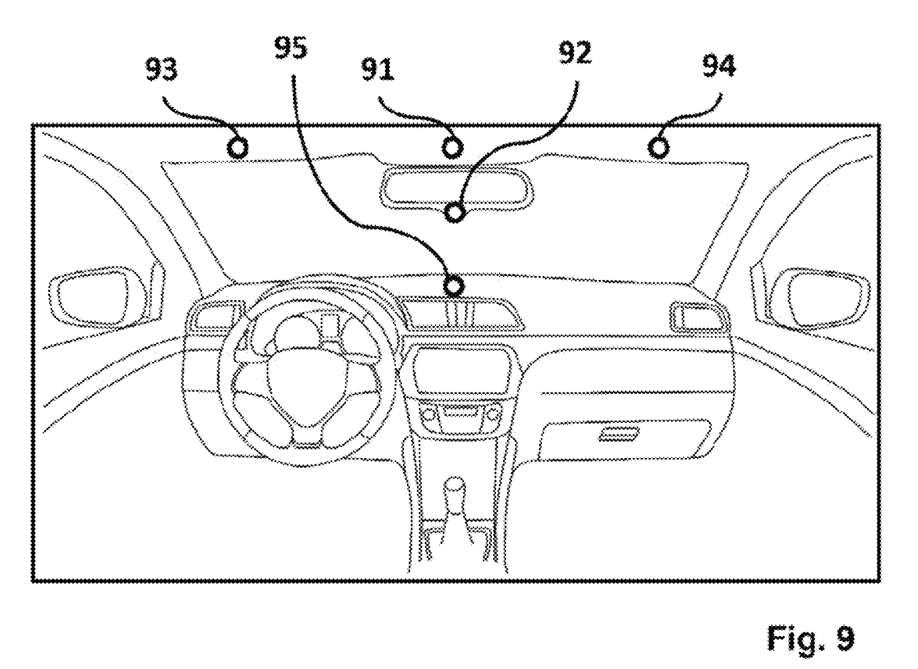
FIG. 9 illustrates a vehicle's interior front according to embodiments of the disclosure.

FIG. 9 presents an interior of a vehicle with possible positions of cameras. The vehicle may only comprise one camera but only a plurality of cameras at different positions. The cameras, which may be color or black/which cameras, infrared cameras, depth cameras, heat cameras, or a combination thereof, can be placed, e.g., in the middle over the front windshield and even over the rearview mirror as illustrated with position 91.

Additionally or alternatively, the or another camera can be located below the rearview mirror as illustrated with position 92. If one camera is located at position 93, another one will usually also be located at position 94. With two cameras a depth image or 3D image can be created. Additionally or alternatively, the or another camera can be located the dashboard or in the middle console as depicted with position 95. These cameras may then capture images, e.g., at regular time intervals or if trigged by an application, e.g., one application executing the seatbelt verification method as described herein. The applications using the images may be executed on the on-board computing system or at least in part executed remotely, e.g., in the cloud.

Figure 10:
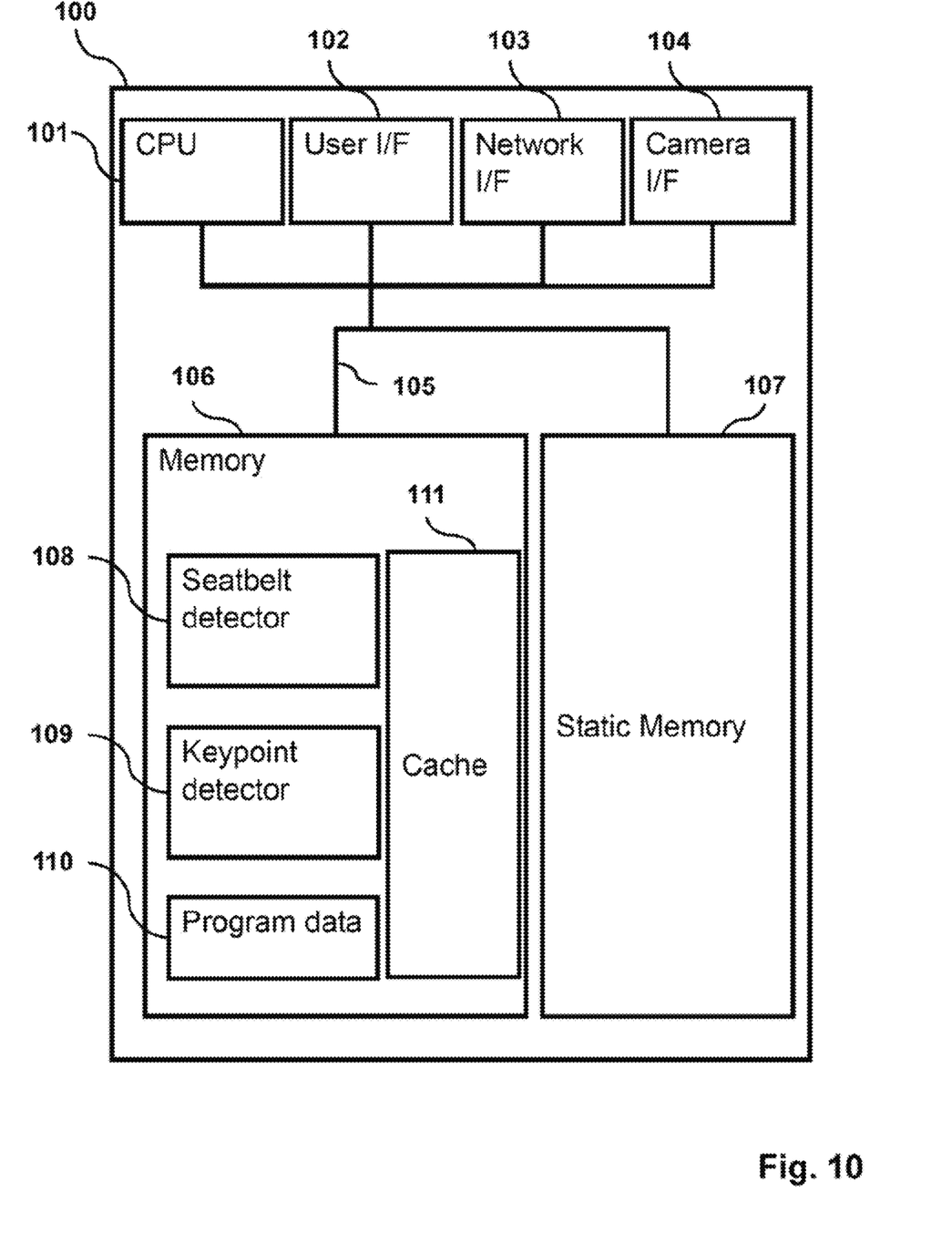
FIG. 10 is diagrammatic representation of a computing system implementing the functionalities described herein.

FIG. 10 is a diagrammatic representation of internal components of a computing system 100 implementing the functionality as described herein. The computing system 100 may be located in the vehicle and includes at least one processor 101, a user interface 102, a network interface 103 and a main memory 106, that communicate with each other via a bus 105. Optionally, the computing system 100 may further include a static memory 107 and a disk-drive unit (not shown) that also communicate with each via the bus 105. A video display, an alpha-numeric input device and a cursor control device may be provided as examples of user interface 102.

Furthermore, the computing system 100 may also comprise a specified camera interface 104 to communicate with an on-board camera of the vehicle. Alternatively, the computing system 100 may communicate with the camera via the network interface 103. The camera is used for taking the image. The computing system 100 may also be connected to database systems (not shown) via the network interface, wherein the database systems store at least part of the images needed for providing the functionalities described herein.

The main memory 106 may be a random-access memory (RAM) and/or any further volatile memory. The main memory 106 may store program code for the seatbelt verification system 108 and, e.g., the keypoint detection module 109. Other modules needed for further functionalities described herein may be stored in the memory 106, too. The memory 106 may also store additional program data required for providing the functionalities described herein.

Part of the program data 110, the keypoint detection module 109 and/or seatbelt verification system 108 may also be stored in a separate, e.g., cloud memory and executed at least in part remotely.

According to an aspect, a vehicle is provided. The herein described methods may be stored as program code 110 or 109 and may be at least in part comprised by the vehicle. The seatbelt verification system may be stored as program code 108 and may also at least in part be comprised by the vehicle. Parts of the program code 108 may also be stored and executed on a cloud server to reduce the computational effort on the vehicle's computing system 100. The vehicle may also comprise a camera, e.g., connected via the camera interface 104, for capturing the image.

According to an aspect, a computer program comprising instructions is provided. These instructions, when the program is executed by a computer, cause the computer to carry out the methods described herein. The program code embodied in any of the systems described herein is capable of being individually or collectively distributed as a program product in a variety of different forms. In particular, the program code may be distributed using a computer readable storage medium having computer readable program instructions thereon for causing a processor to carry out aspects of the embodiments described herein.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

It should be appreciated that while particular embodiments and variations have been described herein, further modifications and alternatives will be apparent to persons skilled in the relevant arts. In particular, the examples are offered by way of illustrating the principles, and to provide a number of specific methods and arrangements for putting those principles into effect.

In certain embodiments, the functions and/or acts specified in the flowcharts, sequence diagrams, and/or block diagrams may be re-ordered, processed serially, and/or processed concurrently without departing from the scope of the disclosure. Moreover, any of the flowcharts, sequence diagrams, and/or block diagrams may include more or fewer blocks than those illustrated consistent with embodiments of the disclosure.

The terminology used herein is for the purpose of describing particular embodiments only and is not intended to be limiting of the embodiments of the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "include", "having", "has", "with", "comprised of", or variants thereof are used in either the detailed description or the claims, such terms are intended to be inclusive in a manner similar to the term "comprising".

While a description of various embodiments has illustrated the method and while these embodiments have been described in considerable detail, it is not the intention of the applicants to restrict or in any way limit the scope of the appended claims to such detail. Additional advantages and modifications will readily appear to those skilled in the art. The disclosure in its broader aspects is therefore not limited to the specific details, representative apparatus and method, and illustrative examples shown and described. Accordingly, the described embodiments should be understood as being provided by way of example, for the purpose of teaching the general features and principles, but should not be understood as limiting the scope, which is as defined in the appended claims.

The scope of the present disclosure includes any feature or combination of features disclosed herein (either explicitly or implicitly), or any generalization thereof, whether or not it mitigates any or all of the problems addressed herein. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computerized method of seatbelt verification in a vehicle comprising:
   generating, based on an image showing a seat of the vehicle, at least one heatmap representing probabilities of a seatbelt being present in regions of the image;
   determining a routing of the seatbelt in the image based on values of the at least one heatmap by fitting one or more parametric curves to the at least one heatmap, the one or more parametric curves representing the routing of the seatbelt in the image; and
   determining whether the seatbelt is worn correctly based on the routing.

2. The method of claim 1, wherein the one or more parametric curves comprise at least one of a circle, a straight line, a sequence of straight lines, an ellipse, a quadratic function, a higher polynomial function, a spline, and a Bezier curve.

3. The method of claim 1, wherein the fitting the one or more parametric curves to the at least one heatmap, the parametric curves representing a routing of the seatbelt in the image, comprises:
   until a stopping condition is fulfilled:
      determining a number of points of the heatmap that have a heat value above a threshold;
      determining a respective parametric curve according to the points; and
      calculating a rating for the parametric curve, wherein the rating reflects the fitting of the parametric curve to the heatmap; and
   returning the parametric curve with a highest rating.

4. The method of claim 3, wherein calculating the rating comprises generating a sum of the heatmap values located in a range next to the parametric curve and/or adding a reward value in response to the parametric curve being similar to a reference parametric curve empirically determined for a position of the seatbelt.

5. The method of claim 1, wherein determining whether the seatbelt is worn correctly on the seat based on the one or more parametric curves comprises:
   determining a relation between the one or more parametric curves and at last one of:
      at least one body keypoint determined for a person detected on the seat;
      at least one seat keypoint determined for the seat;
      parameters of reference parametric curves;
      at least one location in the image related to a seatbelt dispenser or seatbelt buckle; and
      a region of the image determined for the routing of the seatbelt;
   determining, based on the relation, whether the seatbelt is worn correctly.

6. The method of claim 1, wherein the seatbelt is a 3-point seatbelt with a diagonal part and a horizontal part, wherein fitting one or more parametric curves to the at least one heatmap comprises:
   fitting a first parametric curve to the heatmap related to the diagonal part;
   wherein determining whether the seatbelt is worn correctly comprises:
      determining a first position score based on a relation of the first parametric curve to a torso keypoint of a detected person, wherein a position score reflects the correctness of the worn seatbelt.

7. The method of claim 6, wherein fitting the one or more parametric curves to the at least one heatmap further comprises:
   fitting a second parametric curve to the heatmap related to the horizontal part;
   wherein determining whether the seatbelt is worn correctly further comprises:
      determining a second position score based on a relation of the second parametric curve to a torso keypoint of the detected person; and
      generating a fused position score by weighted averaging the first position score and the second position score.

8. The method of claim 1, wherein the method is triggered by at least one of detecting a weight on the seat, detecting that the seatbelt is inserted in a seatbelt buckle, and detecting a person in the vehicle.

9. The method of claim 8, wherein the detecting the person on the seat is based on at least one of the image, an input of an ultrasound sensor, an input based on data from an radar sensor, an input based on data from a Light Detection and Ranging, LiDAR, scanner, a thermal image, temperature measurements, and electromagnetic field measurements.

10. The method of claim 1, further comprising determining a confidence value for the seatbelt being worn correctly on the seat, and, in response to the confidence value being below a threshold, causing an output of at least one of an acoustic warning signal, a visual warning signal, and a warning note on a smart media system.

11. The method of claim 10, wherein the confidence value is further determined based on information received from at least one of a weighting sensor, a seatbelt buckle sensor, or a seatbelt dispenser sensor.

12. A system of seatbelt verification in a vehicle, the system comprising:
- a camera for capturing an image; and
- a computer having a processor and memory configured to (i) generate, based on an image showing a seat of the vehicle, at least one heatmap representing probabilities of a seatbelt being present in regions of the image; (ii) determine a routing of the seatbelt in the image based on values of the at least one heatmap by fitting one or more parametric curves to the at least one heatmap, the one or more parametric curves representing the routing of the seatbelt in the image; and (iii) determine whether the seatbelt is worn correctly based on the routing.

13. The system of claim 12, further comprising the vehicle.

14. A non-transitory computer-readable medium storing computer executable instructions that, when executed by a computer having a processor, cause the computer to perform a method of seatbelt verification in a vehicle, the method comprising:
- generating, based on an image showing a seat of the vehicle, at least one heatmap representing probabilities of a seatbelt being present in regions of the image;
- determining a routing of the seatbelt in the image based on values of the at least one heatmap by fitting one or more parametric curves to the at least one heatmap, the one or more parametric curves representing the routing of the seatbelt in the image; and
- determining whether the seatbelt is worn correctly based on the routing.

\* \* \* \* \*